United States Patent [19]

Yamashita et al.

[11] Patent Number: 5,431,722
[45] Date of Patent: Jul. 11, 1995

US005431722A

[54] INK FOR INKJET PRINTING

[75] Inventors: Yoshiro Yamashita; Toshitake Yui; Fuminori Koide; Akihiko Chujo; Ken Hashimoto, all of Minamiashigara, Japan

[73] Assignee: Fuji Xerox Co., Ltd., Tokyo, Japan

[21] Appl. No.: 136,763

[22] Filed: Oct. 15, 1993

[30] Foreign Application Priority Data

Dec. 1, 1992 [JP] Japan .................. 4-343574

[51] Int. Cl.$^6$ .............................................. C09D 11/02
[52] U.S. Cl. .................. 106/20 R; 106/22 H; 106/23 H
[58] Field of Search ................ 106/22 H, 23 H, 20 R

[56] References Cited

U.S. PATENT DOCUMENTS

| | | | |
|---|---|---|---|
| 4,822,419 | 4/1989 | Pepoy et al. | 106/22 H |
| 5,078,790 | 1/1992 | Tochihara et al. | 106/20 D |
| 5,080,716 | 1/1992 | Aoki et al. | 106/22 H |
| 5,190,581 | 3/1993 | Fukushima et al. | 106/22 R |
| 5,254,159 | 10/1993 | Gundlach | 106/22 K |

FOREIGN PATENT DOCUMENTS

| | | |
|---|---|---|
| 57-209972 | 12/1982 | Japan . |
| 1-149872 | 6/1989 | Japan . |
| 2-233780 | 9/1990 | Japan . |
| 2-233781 | 9/1990 | Japan . |

OTHER PUBLICATIONS

Norman E. Good et al.; *Hydrogen Ion Buffers For Biological Research* vol. 5, No. 2; "Hydrogen Ion Buffers for Biological Research"; Feb., 1966; pp. 467–477.

*Primary Examiner*—Helene Klemanski
*Attorney, Agent, or Firm*—Oliff & Berridge

[57] ABSTRACT

An ink for inkjet printers comprises water, a water-soluble organic solvent, and a colorant. The ink further comprises an amine having at least one substituent selected from the group consisting of a sulfonic acid group, a carboxylic acid group and a halogen atom, so that the variation in pH of the ink can be suppressed to a minimum. The pH of the ink is preferably in the range of from 5 to 9.

9 Claims, No Drawings

INK FOR INKJET PRINTING

BACKGROUND OF THE INVENTION

1. Field of The invention

This invention relates to a novel type of ink for inkjet printing which is suitable for use in inkjet printers

2. Description of The Prior Art

Studies have been intensively made on so-called inkjet printers, wherein a liquid or fused solid ink is jetted such as from nozzles, slits or porous films, because of its small size, inexpensiveness and stillness. Especially, developments have been made on a single black color printer. In fact, there have been now sold on the market printers with which print of good quality is obtained on so-called ordinary papers such as a reporting paper, a copying paper and the like.

As for inks used in inkjet printers, the pH which is one of physical properties of the ink has influences on:

(1) corrosion and decomposition of materials for printer head;
(2) settlement of constituent substances of the ink on storage over a long time, especially, settlement of dyes with inks wherein the dyes are dissolved;
(3) clogging of a printer head with the ink at the tip thereof;
(4) scorching on a heater when droplets are formed by application of a thermal energy; and
(5) hue of printed images.

Thus, the pH should be stably controlled over a long term.

Japanese Laid-open Patent Application No. 57-209972 sets out an ink used in a method of forming ink droplets by application of a thermal energy, wherein the pH of the ink is adjusted to 4 to 9. The pH adjustors used in this application are all either strongly acidic or strongly basic in nature. Because the buffering effect in the pH range of 6 to 8 is not good, a problem is involved in the long term stability in pH of the ink. Japanese Laid-open Patent Application No. 1-149872 discloses the use, as a pH adjustor, of sodium borate, sodium hydrogenphosphate and sodium dihydrogenphosphate. However, the buffering agents are liable to react with polyvalent metal ion impurities to form insoluble salts, thereby causing clogging or uneveness of jetting. In Japanese Laid-open Patent Application Nos. 2-233780 and 2-233781, there are described combinations of phthalocyanine dyes or Direct Yellow 86, water-soluble organic solvents, and alkali metal salts of organic carboxylic acids whose acid dissociation constant at 25° C. at a dissociation stage of 1 is not lower than 4.3. Using the combination, discoloration can be prevented at the time when ordinary papers and particularly, a paper having a high acidity is printed. However, a problem is still left in the long-term stability of pH.

As will be appreciated from the above, a number of techniques of controlling the pH of inks have been proposed but are not always satisfactory with respect to the requirements (1) to (5) set out hereinbefore.

SUMMARY OF THE INVENTION

It is accordingly an object of the invention to provide an ink for inkjet printing which overcomes the problems of the prior art and wherein not only the initial pH of the ink is appropriately controlled, but also the variation in the pH can be suppressed to a minimum during the course of a long-term storage or during use.

It is another object of the invention to provide an ink for inkjet printing which has good dissolution stability and is substantially free of any clogging or uneveness of jetting.

We have found that when an amine having at least one substituent selected from the group consisting of a sulfonic acid group, a carboxylic acid group and a halogen atom is added to an ink composition which comprises water, a water-soluble organic solvent and a colorant, in order to adjust the pH of the ink, the variation in the pH from an initial level is small irrespective of the long-term storage and use conditions. In addition, the ink is imparted with high dissolution stability and is substantially free of any clogging and uneveness of jetting.

The above objects can be achieved, according to the invention, by an ink for inkjet printers which comprises from 1 to 60 wt. % of a water-soluble organic solvent, from 0.3 to 15 wt. % of a colorant, from 0.005 to 5 wt. % of an amine having at least one substituent selected from the group consisting of a sulfonic acid group, a carboxylic acid group and a halogen atom, and the balance being water.

The pH of the ink should preferably be in the range of from 5 to 9.

DETAILED DESCRIPTION AND EMBODIMENTS OF THE INVENTION

The amines which have at least one substituent selected from a sulfonic acid group, a carboxylic acid group and a halogen atom should preferably include aliphatic amines, morpholine derivatives and piperazine derivatives. More particularly, there may be mentioned hydroxyl-substituted or unsubstituted aliphatic carboxylic acids, sulfonic acids and halides having an amino group, an imino group, a piperazinyl group and/or a morpholino group which may be substituted with an alkyl group, a hydroxyalkyl group and/or a carbamoylalkyl group. Typical examples of these compounds include aminoethanesulfonic acid derivatives set forth in Hydrogen Buffer For Biological Research, by N. E. Good (Biochemistry, 5, 467–477 (1966)). Especially, colorless compounds or compounds which are so slightly colored as not impede color development of colorants are preferably used. Specific examples of the amines usable in the practice of the invention are shown in Table 1 below.

TABLE 1

| No. | Compound | pKa |
| --- | --- | --- |
| 1 | 2-morpholinoethanesulfonic acid | 6.15 |
| 2 | N-carbamoylmethyliminodicarboxylic acid | 6.60 |
| 3 | piperazine-N,N'-bis(2-ethanesulfonic acid) | 6.80 |
| 4 | N-2-acetamido-2-aminoethanesulfonic acid | 6.90 |
| 5 | 3-morpholino-2-hydroxypropanesulfonic acid | 6.95 |
| 6 | colamine chloride | 7.10 |
| 7 | N,N-bis(2-hydroxyethyl)-2-aminoethanesulfonic acid | 7.15 |
| 8 | 3-morpholinopropanesulfonic acid | 7.20 |
| 9 | [N-tris(hydroxymethyl)methyl-2-amino]ethanesulfonic acid | 7.50 |
| 10 | N-2-hydroxyethylpiperazine-N'-2-ethanesulfonic acid | 7.55 |
| 11 | 3-[N,N-bis(2-hydroxyethyl)amino]-2-hydroxypropanesulfonic acid | 7.60 |
| 12 | N-carbamoylmethylglycine | 7.70 |
| 13 | 3-[N-(trishydroxymethyl)methylamino]-2-hydroxy-propanesulfonic acid | 7.70 |
| 14 | piperazine-N,N'-bis(2-hydroxypropane-3-sulfonic acid | 7.85 |
| 15 | N'-2'-hydroxyethylpiperazine-N-2-hydroxypropane-3-sulfonic acid | 7.90 |
| 16 | N-2-hydroxyethylpiperazine-N'-3- | 8.00 |

TABLE 1-continued

| No. | Compound | pKa |
|---|---|---|
|  | propanesulfonic acid |  |
| 17 | tris(hydroxymethyl)methylglycine | 8.15 |
| 18 | N,N-bis(2-hydroxyethyl)glycine | 8.35 |
| 19 | N-tris(hydroxymethyl)methyl-3-aminopropane-sulfonic acid | 8.40 |

The amines indicated in Table 1 may have a satisfactory effect when used singly. In order to develop a greater buffering effect, it is preferred to use the amines in combination with bases such as LiOH, NaOH, KOH, ammonia, pyridine and the like. In this case, when the base is added to the amine in an amount of the half of the neutralization equivalent, the pH value corresponding to the pKa value of the amine is attained. Since the amines indicated in Table 1 have, respectively, different pH stable ranges, they are properly selected depending on an intended pH. In general, materials including a material for head which are invariably contacted with an ink within an inkjet printer are unlikely to undergo corrosion, dissolution, separation and the like deterioration in the vicinity of a neutral range. The ink of the invention should preferably have a pH in the range of from 5 to 9, more preferably from 6 to 8.

The amine is used in an amount of from 0.005 to 5 wt. %, preferably from 0.01 to 2 wt. %, of the total ink.

The water-soluble organic solvents which are one constituent of the ink of the invention include, for example, polyhydric alcohols such as ethylene glycol, diethylene glycol, propylene glycol, polyethylene glycol, triethylene glycol, glycerine, thiodiglycol and the like, glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether and the like, basic solvents such as pyrrolidone, N-methyl-2-pyrrolidone, triethanolamine and the like, alcohols such as ethyl alcohol, isopropyl alcohol, butyl alcohol, benzyl alcohol and the like, dimethylsulfoxide, sulfolane and the like. These solvents may be used singly or in combination. If the content of the water-soluble organic solvent is too large, the ink viscosity increases, resulting in a lowering of jetting stability. Accordingly, the content of the water-soluble organic solvent is preferably in the range of about 1 to 60 wt. %, more preferably about 5 to 40 wt. %, based on the total ink.

The colorants may be various types of dyes, pigments, and colored polymers and waxes. It is preferred to use water-soluble dyes. The water-soluble dyes may be acid dyes, direct dyes, basic dyes, reactive dyes and the like. More preferably, the dyes include, for example, C. I. Direct Black-2, -4-, -9, -11, -17, -19, -22, -32, -80, -151, -154, -168, -171 and -194, C. I. Direct Blue-1, -2, -6, -8, -22, -34, -70, -71, -76, -78, -86, -112, -142, -165, -199, -200, -201, -202, -203, -207, -218, -236 and -287, C. I. Direct red-1,-2, -4, -8, -9, -11, -13, -15, -20, -28, -31, -33, -37, -39, -51, -59, -62, -63, -73, -754, -80, -81, -83, -87, -90, -94, -95, -99, -101, -110 and -189, C. I. Direct Yellow-1, -2, -4, -8, -11, -12, -26, -27, -28, -33, -34, -41, -44, -48, -58, -86, -87, -88, -135, -142 and -144, C. I. Food Black-1 and -2, C. I. Acid Black-1, -2, -7, -16, -24, -26, -28, -31, -48, -52, -63, -107, -112, -118, -119, -121, -156, -172, -194 and -208, C. I. Acid Blue-1, -7-, -9, -15, -22, -23, -27, -29, -40, -43, -55, -59, -62, -78, -80, -81, -83, -90, -102, -104, -111, -185, -249 and -254, C. I. Acid Red-1, -4,-8,-13, -14, -15, -18, -21, -26, -35, -37, -110, -144, -180, -249 and -257, C. I. Acid Yellow-1, -3, -4, -7, -11, -12, -13, -14, -18, -19, -23, -25, -34, -38, -41, -42, -44, -53, -55, -61, -71, -76, -78, -79 and -122. The content of the dye is in the range of from about 0.3 to 15 wt. %, preferably from about 1 to 10 wt. %, based on the total ink. These dyes may be used singly. Alternatively, two or more dyes may be used in combination. Still alternatively, aside from four primary colors of cyan, magenta, yellow and black, custom colors such as red, blue and green may be prepared using combinations of these dyes. As a matter of course, pigments may be used as a colorant. For instance, there are used carbon black, Brilliant Carmine BS, Lake Carmine FB, Brilliant Fast Scarlet, Disazo Yellow, Permanent Red R, Fast Yellow 10G, Phthalocyanine Blue, Blue Lake, Yellow Lake, Rhodamine Lake and the like.

The ink of the invention further comprises the balance of water. Distilled water, deionized water and the like may be used.

In the practice of the invention, for the purpose of shortening the drying time of an ink, surface active agents may be added for use as a penetrator for enhancing penetration into paper, or as an additive for stabilizing a dissolved or dispersed state of dyes or pigments. Examples of such surface active agents include nonionic, anionic, cationic or amphoteric surface active agents. The nonionic surface active agents include, for example, polyoxyethylene nonyl phenyl ether, polyoxyethylene octyl phenyl ether, polyoxyethylene dodecyl phenyl ether, polyoxyethylene alkyl ethers, polyoxyethylene polyoxypropylene block copolymers, polyoxyethylene fatty acid esters, sorbitan fatty acid esters, polyoxyethylene sorbitan fatty acid esters, fatty acid alkylolamides and the like.

Examples of the anionic surface active agents include ester salts such as alkylbenzenesulfonates, alkylphenylsulfonates, alkylnaphthalenesulfonates, formalin condensates of naphthalenesulfonates, higher fatty acid salts, sulfuric ester salts of higher fatty acid esters, sulfonates of higher fatty acid esters, sulfuric acid esters and sulfonates of higher alcohol ethers, alkylcarboxylates of higher alkylsulfoneamides, sulfosuccinates, and sulfosuccinic acid ester salts. Examples of the cationic surface active agents include primary to tertiary amine salts, quaternary ammonium salts and the like. Examples of the amphoteric surface active agents include betaine, sulfobetaine, sulfate betaine and the like.

Asides, there may be used other additives including solubilizing agents such as urea, acetamides and the like, physical property modifiers such as polyethyleneimine, polyamines, polyvinylpyrrolidone, polyethylene glycol, cellulose derivatives, and inclusion compounds such as cyclodextrin, macrocyclic amines, crown ethers and the like. If necessary, antifungal agents and conductive agents may be further added.

The ink of the invention may be applied to any known inkjet systems. For instance, such systems include piezoelectric inkjet systems, thermal inkjet systems, continuous jetting systems, electrostatic inductive systems and the like. Preferably, piezoelectric and thermal inkjet systems are mentioned.

When the ink of the invention has once been set at an initial pH level of 5 to 9, preferably 6 to 8, the pH undergoes little change after storage over a long time or on heating or on contact with air. Accordingly, the ink kept after long-time storage can be used for printing without any problem. The reason why the pH of the ink is unlikely to undergo change is not clearly understood at the present stage of our investigations. It is assumed that the amine has a zwitterion structure in the ink and interacts with a colorant to stabilize the micells of the colorant. Thus, the change in pH as will be caused by the changes in the states of the micell and coagulation of the ink is prevented. It is also assumed that where a basic component is further incorporated, H+ is supplied from the ammonium ions of the zwitterion structure and that if an acidic component is increased in amount, the nitrogen atom in the form of an anion or amine is combined with H+ to keep the equilibrium condition. No change of the micell and coagulation states of the colorant is considered to result not only in the stabilization of the pH, but also in the prevention of clogging or unevenness of jetting. The amines are not likely to form complexes with other materials of the ink, particularly, polyvalent metal cations present in colorants, so that clogging will not be caused owing to the formation of insoluble matters.

The present invention is described in more detail by way of examples. Comparative examples are also described.

EXAMPLE 1

| | |
|---|---|
| C. I. Direct Black 168 | 3 parts by weight |
| Diethylene glycol | 15 parts by weight |
| Compound No. 7 indicated in Table 1 | 0.4 parts by weight |
| NaOH | 0.2 parts by weight |
| Pure water | 80 parts by weight |

The above ingredients were sufficiently mixed and dissolved, followed by filtration under pressure through a 0.45 μm filter to obtain an ink. The thus obtained ink had a viscosity of 1.8 cps., and a surface tension of 55 dynes/cm.

| | |
|---|---|
| Comparative Example 1 | |
| C. I. Direct Black 168 | 3 parts by weight |
| Diethylene glycol | 15 parts by weight |
| Pure water | 80 parts by weight |
| Comparative Example 2 | |
| C. I. Direct Black 168 | 3 parts by weight |
| Diethylene glycol | 15 parts by weight |
| HCl | 0.05 parts by weight |
| NaOH | 0.02 parts by weight |
| Pure water | 80 parts by weight |

The above ingredients of the respective comparative examples were treated in the same manner as in Example 1 to obtain two types of inks. The inks had, respectively, a viscosity of 1.8 cps., and a surface tension of 55 dynes/cm.

EXAMPLE 2

| | |
|---|---|
| C. I. Direct Yellow 86 | 2 parts by weight |
| Glycerine | 10 parts by weight |
| Diethylene glycol monobutyl ether | 10 parts by weight |
| Compound No. 2 indicated in Table 1 | 0.2 parts by weight |
| NaOH | 0.08 parts by weight |
| Pure water | 80 parts by weight |

The above ingredients were treated in the same manner as in Example 1 to obtain an ink. The thus obtained ink had a viscosity of 2.3 cps., and a surface tension of 36 dynes/cm.

| | |
|---|---|
| Comparative Example 3 | |
| C. I. Direct Yellow 86 | 2 parts by weight |
| Glycerine | 10 parts by weight |
| Diethylene glycol monobutyl ether | 10 parts by weight |
| Potassium dihydrogenphosphate | 0.1 part by weight |
| sodium hydrogenphosphate | 0.1 part by weight |
| Pure water | 80 parts by weight |
| Comparative Example 4 | |
| C. I. Direct Yellow 86 | 2 parts by weight |
| Glycerine | 10 parts by weight |
| Diethylene glycol monobutyl ether | 10 parts by weight |
| Acetic acid | 0.1 part by weight |
| KOH | 0.02 parts by weight |
| Pure water | 80 parts by weight |

The above ingredients of the respective comparative examples were treated in the same manner as in Example 1 to obtain two types of inks. The inks had, respectively, a viscosity of 2.3 cps., and a surface tension of 36 dynes/cm.

Evaluation of Inks (1) Initial pH of ink

The pH was measured by use of a pH meter (made by Horiba Seisakusho K.K.) under conditions of 20° C. and 50% R.H.

(2) Variation of the pH of ink under storage 100 ml of an ink was placed in a one liter synthetic resin bottle, hermetically sealed and stored at 20° C. over one month, followed by measurement of the pH.

(3) Change of ink under storage (accelerated mode)

100 ml of an ink was placed in a one liter synthetic resin bottle, hermetically sealed, kept in a temperature controlled chamber at 70° C. over 500 hours and returned to under conditions of 20° C. and 50% R.H., followed by measurement of the pH and observation as to whether or not the dye is settled.

(4) Surface tension of ink

The ink was subjected to measurement of the surface tension using the Wilhelmy's surface balance under conditions of 20° C. and 50% R.H.

(5) Ink viscosity

The ink was subjected to measurement of the viscosity at a velocity under shear of 1,400 second$^{-1}$ under conditions of 20° C. and 50% R.H.

(6) Continuous jetting test

The inks provided immediately after the preparation and after the accelerated mode were each subjected to a continuous jetting test wherein one hundred A4-size sheets were printed using a piezoelectric ink jet printer made on an experimental basis for evaluation. During the test, a variation in the amount of the jetted ink and the slip and disorder of print images were assessed according to the following standards.

◯: a variation in amount of jetted ink of less than ±10% with no slip and disorder defects of the image.

Δ: a variation in amount of jetted ink of ±10% to 20% with a quantity of slip and disorder defects of the image being less than 5%.

X: a variation in amount of jetted ink of greater than 20% with a quantity of slip and disorder defects of the image being not less than 5%.

(7) Head immersion test

An ink jet head was immersed in an ink and kept under conditions of 60° C. over 500 hours to observe and evaluate the state of the head according to the following standards.

○: no change
Δ: a slight degree of strain
X: separated or dissolved out (8) Clogging test The inks subjected to the accelerated mode were each placed in a thermal ink jet printer made on an experimental basis for evaluation. After completion of the ink jetting, the printer was allowed to stand over one week in a capped condition. Thereafter, the ink jetting was re-started to observe and evaluate the disorder of the resultant image according to the following standards.

○: no slip and disorder of image
Δ: a quantity of slip and disorder defects of image of less than 5%
X: a quantity of slip and disorder defects of image of not less than 5%

The results are shown in Table 2.

TABLE 2

| | Ex. 1 | Comp. Ex. 2 | Comp. Ex. 2 | Ex. 2 | Comp. Ex. 3 | Comp. Ex. 4 |
|---|---|---|---|---|---|---|
| Initial pH of ink | 7.0 | 7.7 | 5.9 | 7.1 | 6.9 | 7.7 |
| pH of ink after kept at normal temperatures | 7.0 | 8.0 | 5.4 | 7.1 | 6.8 | 6.8 |
| Variation in pH of ink | 0 | +0.3 | −0.5 | 0 | −0.1 | −0.9 |
| Dye settlement after storage under heating conditions | no | no | yes | no | no | no |
| Ink pH after storage under heating conditions | 7.1 | 8.4 | 4.9 | 7.0 | 6.7 | 5.4 |
| Variation in ink pH | +0.1 | +0.7 | −1.0 | −0.1 | −0.2 | −2.3 |
| Continuous jetting test (immediately after preparation) | ○ | ○ | Δ | ○ | ○ | ○ |
| Continuous jetting test (after storage under heating conditions) | ○ | X | X | ○ | X | X |
| Head immersion test | ○ | X | ○ | ○ | ○ | ○ |
| Clogging test | ○ | ○ | X | ○ | Δ | Δ |

As will be apparent from Table, the inks of Examples 1 and 2 exhibit good results of all the evaluation tests. On the contrary, with the inks of the comparative examples, the inks after storage under heating conditions present the problems of clogging and unevenness of jetting.

EXAMPLE 3

| | |
|---|---|
| C. I. Acid Blue-9 | 2 parts by weight |
| Ethylene glycol | 20 parts by weight |
| Compound No. 4 indicated in Table 1 | 0.1 part by weight |
| NaOH | 0.02 parts by weight |
| Pure water | 80 parts by weight |

The above ingredients were treated in the same manner as in Example 1 to obtain an ink. The thus obtained ink had a viscosity of 2.2 cps., and a surface tension of 51 dynes/cm. The initial pH was found to be 6.9 and the pH after storage under heating conditions was 6.8. The continuous jetting, immersion and clogging tests were all evaluated as ○.

EXAMPLE 4

| | |
|---|---|
| C. I. Food Black 2 | 4 parts by weight |
| Diethylene glycol | 15 parts by weight |
| Compound No. 14 indicated in Table 1 | 0.5 parts by weight |
| Pure water | 80 parts by weight |

The above ingredients were treated in the same manner as in Example 1 to obtain an ink. The thus obtained ink had a viscosity of 1.9 cps., and a surface tension of 50 dynes/cm. The initial pH was found to be 8.0 and the pH after storage under heating conditions was 7.9. The continuous jetting, immersion and clogging tests were all evaluated as ○.

EXAMPLE 5

| | |
|---|---|
| C. I. Direct Black 154 | 3 parts by weight |
| Glycerine | 15 parts by weight |
| $HO(C_2H_4O)_a(C_3H_6O)_b(C_2H_4O)_cH$ (oxypropylene block molecular weight 1800, oxyethylene content of 20%, average molecular weight of about 2250) | 0.5 parts by weight |
| Diethylene glycol monobutyl ether | 10 parts by weight |
| Compound No. 10 indicated in Table 1 | 0.1 part by weight |
| Pure water | 70 parts by weight |

The above ingredients were treated in the same manner as in Example 1 to obtain an ink. The thus obtained ink had a viscosity of 2.8 cps., and a surface tension of 36 dynes/cm. The initial pH was found to be 7.4 and the pH after storage under heating conditions was 7.3. The continuous jetting, immersion and clogging tests were all evaluated as ○.

EXAMPLE 6

| | |
|---|---|
| C. I. Direct Blue 86 | 2 parts by weight |
| Diethylene glycol | 25 parts by weight |
| Compound No. 3 indicated in Table 1 | 0.1 part by weight |
| NaOH | 0.01 part by weight |
| Pure water | 75 parts by weight |

The above ingredients were treated in the same manner as in Example 1 to obtain an ink. The thus obtained ink had a viscosity of 2.5 cps., and a surface tension of 53 dynes/cm. The initial pH was found to be 6.7 and the pH after storage under heating conditions was 6.6. The continuous jetting, immersion and clogging tests were all evaluated as ○.

EXAMPLE 7

| | |
|---|---|
| C. I. Direct Yellow 144 | 3 parts by weight |
| Polyethylene glycol M.W.200 | 10 parts by weight |
| Compound No. 8 indicated in Table 1 | 0.6 parts by weight |
| NaOH | 0.06 parts by weight |
| Pure water | 85 parts by weight |

The above ingredients were treated in the same manner as in Example 1 to obtain an ink. The thus obtained ink had a viscosity of 1.8 cps., and a surface tension of 55 dynes/cm. The initial pH was found to be 7.2 and the pH after storage under heating conditions was 7.1. The continuous jetting, immersion and clogging tests were all evaluated as ○.

EXAMPLE 8

| | |
|---|---|
| C. I. Acid Red 249 | 3 parts by weight |
| Propylene glycol | 20 parts by weight |
| HO(C$_2$H$_4$O)$_a$(C$_3$H$_6$O)$_b$(C$_2$H$_4$O)$_c$H | 1 part by weight |
| (oxypropylene block molecular weight | |
| 1800, oxyethylene content of 40%, | |
| average molecular weight of about 3000) | |
| Compound No. 2 indicated in Table 1 | 0.1 part by weight |
| LiOH | 0.05 parts by weight |
| Pure water | 75 parts by weight |

The above ingredients were treated in the same manner as in Example 1 to obtain an ink. The thus obtained ink had a viscosity of 2.0 cps., and a surface tension of 36 dynes/cm. The initial pH was found to be 7.0 and the pH after storage under heating conditions was 7.2. The continuous jetting, immersion and clogging tests were all evaluated as ○.

EXAMPLE 9

| | |
|---|---|
| C. I. Direct Yellow 144 | 2 parts by weight |
| Triethylene glycol | 25 parts by weight |
| Compound No. 1 indicated in Table 1 | 0.1 part by weight |
| Pure water | 75 parts by weight |

The above ingredients were treated in the same manner as in Example 1 to obtain an ink. The thus obtained ink had a viscosity of 2.7 cps., and a surface tension of 54 dynes/cm. The initial pH was found to be 6.1 and the pH after storage under heating conditions was 5.9. The continuous jetting, immersion and clogging tests were all evaluated as ○.

EXAMPLE 10

| | |
|---|---|
| C. I. Direct Black 168 | 3 parts by weight |
| Diethylene glycol | 15 parts by weight |
| Compound No. 19 indicated in Table 1 | 0.2 parts by weight |
| LiOH | 0.05 parts by weight |
| Pure water | 80 parts by weight |

The above ingredients were treated in the same manner as in Example 1 to obtain an ink. The thus obtained ink had a viscosity of 2.0 cps., and a surface tension of 56 dynes/cm. The initial pH was found to be 8.5 and the pH after storage under heating conditions was 8.6. The continuous jetting and clogging tests were all evaluated as ○. The immersion test was evaluated as Δ.

EXAMPLE 11

| | |
|---|---|
| C. I. Acid Red 249 | 2 parts by weight |
| Propylene glycol | 15 parts by weight |
| Compound No. 7 indicated in Table 1 | 0.05 parts by weight |
| Pure water | 85 parts by weight |

The above ingredients were treated in the same manner as in Example 1 to obtain an ink. The thus obtained ink had a viscosity of 1.7 cps., and a surface tension of 52 dynes/cm. The initial pH was found to be 4.9 and the pH after storage under heating conditions was 4.5. The continuous jetting test was evaluated as ○ for the ink immediately after preparation but as Δ for the ink after being kept under heating conditions. The immersion test was assessed as ○ and the clogging test was evaluated as Δ.

EXAMPLE 12

| | |
|---|---|
| C. I. Direct Blue 199 | 3 parts by weight |
| Glycerine | 10 parts by weight |
| Sulfolane | 2 parts by weight |
| Compound No. 5 indicated in Table 1 | 0.2 parts by weight |
| Pure water | 85 parts by weight |

The above ingredients were treated in the same manner as in Example 1 to obtain an ink. The thus obtained ink had a viscosity of 1.8 cps., and a surface tension of 55 dynes/cm. The initial pH was found to be 6.6 and the pH after storage under heating conditions was 6.7. The continuous jetting, immersion and clogging tests were all evaluated as ○.

EXAMPLE 13

| | |
|---|---|
| C. I. Direct Black 19 | 4 parts by weight |
| Diethylene glycol | 10 parts by weight |
| Isopropyl alcohol | 3 parts by weight |
| Compound No. 4 indicated in Table 1 | 0.1 part by weight |
| Pure water | 80 parts by weight |

The above ingredients were treated in the same manner as in Example 1 to obtain an ink. The thus obtained ink had a viscosity of 1.7 cps., and a surface tension of 45 dynes/cm. The initial pH was found to be 6.9 and the pH after storage under heating conditions was 7.1. The continuous jetting, immersion and clogging tests were all evaluated as ○.

EXAMPLE 14

An ink containing carbon black, ethylene glycol, HO(C$_2$H$_4$O)$_a$(C$_3$H$_6$O)$_b$(C$_2$H$_4$O)$_c$H (oxypropylene block molecular weight 1800, oxyethylene content of 40%, average molecular weight of about 3000), Compound 9 indicated in Table 1, KOH and pure water was obtained in the same manner as in Example 1.

The thus obtained ink had a viscosity of 2.2 cps., and a surface tension of 52 dynes/cm. The initial pH was found to be 6.7 and the pH after storage under heating conditions was 6.6. The continuous jetting, immersion and clogging tests were all evaluated as ○.

As will be apparent from the foregoing, the ink of the invention suffers a reduced degree of pH change after being kept over a long term or during use. In addition, the variation from an initial pH level can be suppressed to a minimum. Thus, the stability of the pH in relation to the time is very good. In addition, the ink does not cause head materials to be degraded with good dissolution stability, thereby preventing the head from being clogged and the uneveness of jetting.

What is claimed is:

1. An ink for inkjet printers which comprises from 1 to 60 wt. % of a water-soluble organic solvent, from 0.3 to 15 wt. % of a colorant, from 0.005 to 5 wt. % of an amine having at least one substituent selected from the group consisting of a sulfonic acid group, a carboxylic acid group and a halogen atom, and the balance being water.

2. An ink according to claim 1, wherein said water-soluble organic solvent is present in an amount of from 5 to 40 wt. %.

3. An ink according to claim 1, wherein said colorant is present in an amount of from 1 to 10 wt. %.

4. An ink according to claim 1, wherein said amine is at least one member selected from aliphatic amines, morpholine derivatives and piperazine derivatives.

5. An ink according to claim 1, wherein said amine is present in an amount of from 0.01 to 2 wt. %.

6. An ink according to claim 1, wherein said amine is used in combination with a base.

7. An ink according to claim 6, wherein said base is a member selected from the group consisting of LiOH, NaOH, KOH, ammonia and pyridine.

8. An ink according to claim 6, wherein said base is added in an amount of ½ of a neutralization equilibrium to said amine.

9. An ink according to claim 1, wherein said ink has a pH ranging from 5 to 9.

* * * * *